US005286143A

United States Patent [19]
Schimke

[11] Patent Number: 5,286,143
[45] Date of Patent: Feb. 15, 1994

[54] WOOD BIT AND METHOD OF MAKING

[75] Inventor: Thomas O. Schimke, Louisville, Ky.
[73] Assignee: Vermont American Corporation, Louisville, Ky.

[21] Appl. No.: 883,522
[22] Filed: May 20, 1992
[51] Int. Cl.[5] .............. B23B 51/02
[52] U.S. Cl. .............. 408/211; 76/101.1; 76/108.1; 408/213; 408/225
[58] Field of Search .............. 76/108.1, 108.6, 101.1; 408/211, 212, 213, 225, 227, 228

[56] References Cited

U.S. PATENT DOCUMENTS

| | | | |
|---|---|---|---|
| 877,592 | 1/1908 | Parry et al. . | |
| 915,503 | 6/1969 | Whitehouse . | |
| 2,613,710 | 10/1952 | Emmons | 408/213 |
| 2,627,292 | 2/1953 | Kronwall . | |
| 2,692,627 | 10/1954 | Stearns | 408/211 |
| 2,782,824 | 2/1957 | Robinson . | |
| 3,920,350 | 11/1975 | Southall . | |
| 4,050,841 | 9/1977 | Hildebrandt . | |
| 4,066,379 | 1/1978 | Prohaska . | |
| 4,286,904 | 9/1981 | Porter . | |
| 4,625,593 | 12/1986 | Schmotzer | 408/211 |
| 4,682,917 | 7/1987 | Williams, III et al. . | |
| 5,061,127 | 10/1991 | Thomas | 408/212 |

FOREIGN PATENT DOCUMENTS

| | | | |
|---|---|---|---|
| 2005775 | 8/1971 | Fed. Rep. of Germany | 408/213 |
| 2636182 | 2/1978 | Fed. Rep. of Germany | 408/213 |

*Primary Examiner*—Daniel W. Howell
*Attorney, Agent, or Firm*—Middleton & Reutiliinger

[57] ABSTRACT

The present invention comprises a wood bit for use in wood working applications. The blade of the bit is generally spade shaped having cutting spurs on each corner of the blade, a central point projecting from the leading end of the blade, and hooked cutting edges.

A progressive transfer die is used to bend the leading end of the blade and forge a continuous hook angle extending along the side cutting spur, the lateral shoulder, and the central point of the blade. The forging of a hook extending from each side of the blade converging at a central point provides a hook along the leading end of the blade projecting outwardly (in the direction of rotation) pass the plane of the blade face. The leading end of the hook is beveled forming a continuous cutting edge extending along the hook from the outer side wall of the blade through the outside cutting spurs, along the lateral shoulders, and along each side of the central point.

13 Claims, 6 Drawing Sheets

WOOD BIT AND METHOD OF MAKING

BACKGROUND OF THE INVENTION

The present invention relates to a wood bit for boring holes in wood or similar materials. Wood bits generally have a central point and a spade shaped blade or cutting section attached to a shaft, wherein the bit is usually driven by some type of power tool.

Wood bits known in the art utilize blades of various shapes and sizes, some incorporating spurs on the outside edges of the shoulders to provide better penetration of the blade into the wood substrate. Often the blades of wood bits include flutes ground into the surface of the cutting blade face along the shoulder or tip to enhance the cutting effect and provide better deflection of the wood chips from the bore. Conventional methods of forming flutes or grooves into the blade face utilize grinding processes which cut into the blade surface, thereby decreasing the thickness of the blade in the area of the groove, and forming a deflection surface within the blade face so that chips must be deflected at a sharp, acute angle formed by the outer surface of the flute joining the inner surface of the flute. Usually the cutting edges are formed on the leading end of the blade separated from the flutes. These conventional wood bits are usually flat, having cutting edges which do not project outward pass the plane of the blade face.

For example, the Williams III, U.S. Pat. No. 4,682,917 describes a wood bit designed having a flute ground into the blade face extending from the tip and along the lateral shoulder portion of the blade, stopping where the rake of the shoulder spur intersects the shoulder flute. The leading cutting edges of the blade remain level with, or recessed within the face of the blade.

The chip deflection means of the present invention is designed to be manufactured in a one step bending process simplifying and reducing the expense of a milling and/or grinding step to cut the desired flute pattern into the blade surface. The chip removal means of the present invention does not utilize a flute formed at an acute angle such as used in the Williams III bit, but rather utilizes a forging process to bend a continuous hook into the leading end of the blade extending along the lateral shoulders and converging in a central point. Wood shavings are directed upwardly onto the blade surface at an obtuse angle rather than an acute angle as taught in the William's reference in order to provide more efficient removal of the chip debris from the cutting surface. The leading end of the blade, including the hook is of generally uniform thickness. The design of the hook projecting beyond or outwardly (in the direction of rotation) pass the plane of the blade surface and along the lateral shoulder and central point maximizes the strength and long life of the cutting edges of the blade while the forging process minimizes waste material formed during the manufacture of the wood bit.

Although several different types of wood bits are commercially available, there exists a need to provide a wood bit which is characterized by having good penetrability, durability, and is inexpensive to manufacture.

Accordingly, it is an object of the present invention to provide a novel and improved wood bit having good penetrability and durability.

It is an object of the present invention to provide a wood bit with a spade shaped blade having an improved cutting edge utilizing cutting spurs on the corners of the blade.

Furthermore, it is another object of the present invention to provide the advantages of better chip flow through the use of an obtuse hook angle formed by a forging process to bend the leading end of the blade in opposite directions (in the direction of rotation) on each side of the blade axis, and to extend the leading end of the blade beyond the plane of the blade surface, forming a hook extending continuously from the side of the blade along the lateral shoulder to the central point, whereby the leading end of the hook projects beyond or outwardly of (in the direction of rotation) the plane of the blade surface.

It is yet another object of the present invention to provide a wood bit having beveled cutting edges extending continuously along the leading edge of the hook of the blade from the side edge of the blade through the cutting spur, along the lateral shoulder, and terminating at a central point to provide high performance at a low cost.

Finally, it is an object of the present invention to manufacture a wood bit by a method requiring fewer process steps so that the wood bit can be manufactured and sold at a lower price to a wide range of commercial and home markets users.

SUMMARY OF THE INVENTION

The present invention comprises a wood bit for use in the wood working industry.

Typically, wood bits are manufactured in multi-step processes which require that the blade be forged from metal stock and the face of the blade be milled or ground to form the cutting edge as well as the various bevels and flutes which improve the performance of the blade. The novelty of the wood bit of the present invention is attributed to its design which facilitates a simple and inexpensive method of manufacturing a wood bit of unitary design by forging an obtuse continuous hook angle along the leading end of the blade using a progressive transfer die press process rather than the typical multi-step grinding or milling procedure.

The spade shaped blade of the wood bit of the present invention includes a pair of cutting spurs extending from the corner of each side of the blade, a pair of lateral shoulders, and a central point extending axially from the center of the blade. The leading front end of the blade is bent and twisted in opposite directions perpendicular to the longitudinal axis with respect to the blade plane forming a continuous hook along the leading end of the blade projecting beyond or outwardly (in the direction of rotation) pass the plane of the blade on each side of the blade, extending from each side through the side cutting spur, the lateral shoulders, and the central point. The leading edge of the hook is beveled forming a continuous cutting edge thereon.

BRIEF DESCRIPTION OF THE DRAWINGS

A better understanding of the present invention will be had upon reference to the following description in conjunction with the accompanying drawings in which like numerals refer to like parts throughout the several views and wherein.

SPECIFICATION

Figure 1:
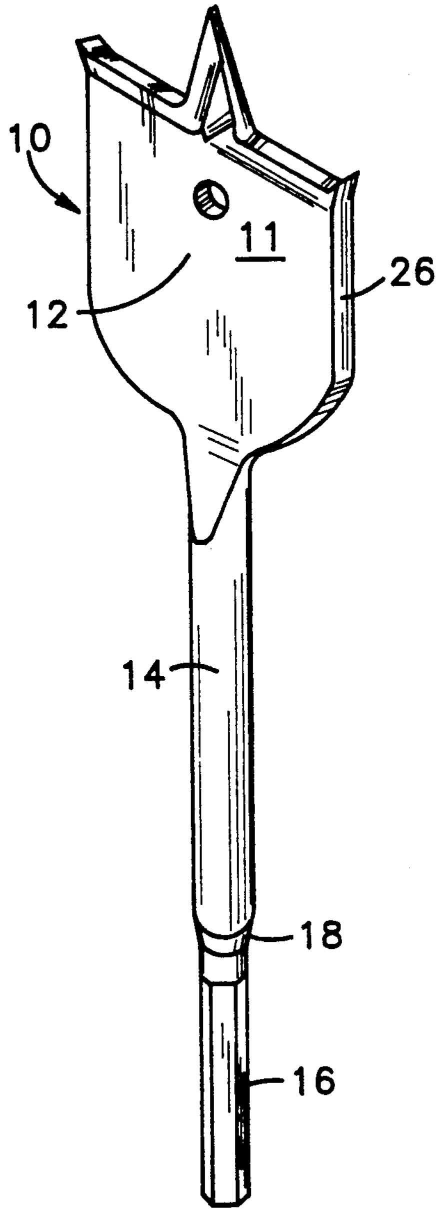
FIG. 1 is an elevated perspective view of the wood bit of the present invention.

As shown in the enclosed drawings, the wood bit 10 of the present invention has a blade 12 connected to a generally elongated, cylindrical shank 14 having a tapered shoulder 18 connected to a hexagonal driving end 16 of reduced diameter. The driving end 16 is adapted to fit into the chuck of a drill or other power tool which drives the wood bit 10.

FIG. 1 shows the generally flat, spade shaped blade 12 being several times wider than the shank 14. The blade 12 has a pair of parallel, opposite, substantially large planar face surfaces, first large planar front face 11 and second large planar back face 13 (not shown). As shown in FIG. 1, first face 11 is interconnected to face 13 by a first outer left side wall 24 (not shown), and a second outer right side wall 26.

The wood bit 10 of the present invention is of unitary construction, wherein the blade 12 and shank 14 are manufactured from a single piece of metal stock. The unitary construction of the wood bit 10 is designed to provide optimal structural support against bending and shear forces on the shaft 14 at the point where the wood bit 10 is subjected to the greatest stress and metal fatigue. The low cost material used to produce the preferred embodiment is carbon steel which has a Rockwell "C" hardness range in the low 50's. Various metals and alloys can be used to construct the wood bit of the present invention; however, carbon steel is inexpensive, easy to machine and temper, and holds a cutting edge.

Figure 2:
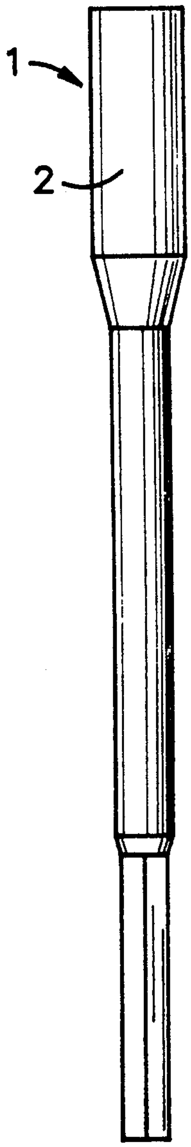
FIG. 2 shows a front plane view of a cylindrically shaped headed blank used to make the wood bit of the present invention.
Figure 3:
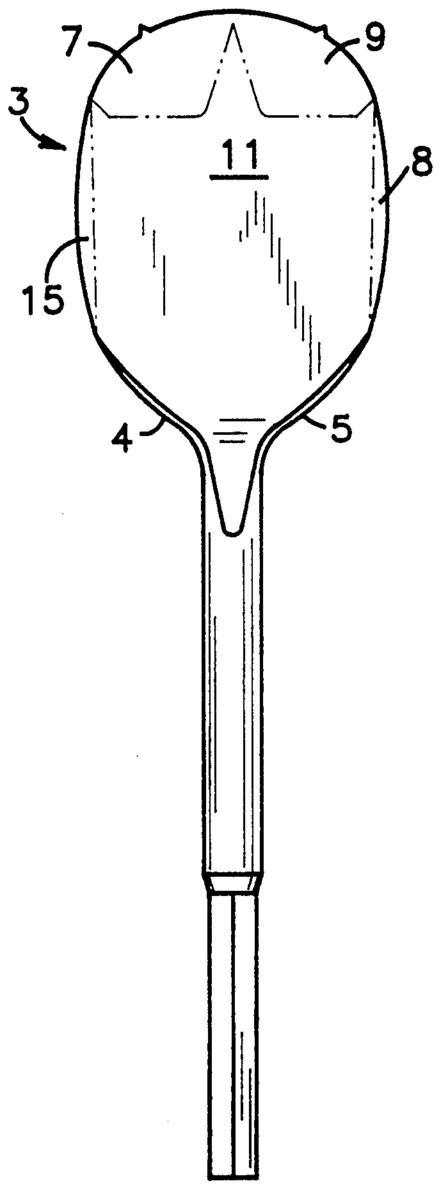
FIG. 3 is a front plane view of a flattened blank forged from the headed blank of FIG. 2 showing a phantom view of the sections to be trimmed from the flattened blank to make the wood bit of the present invention.

The wood bit 10 of the present invention is manufactured by compressing a generally cylindrical headed blank 1 of carbon steel, as shown in FIG. 2, and flattening the head 2 in a die to form a flattened blank 3, as shown in FIG. 3. The flattened blank 3 may be heated to facilitate the flattening process depending upon the size and weight of the headed blank 1.

As shown in FIG. 3, flattening of the headed blank 1 contours the rear portion of the blade 12 adjoining the shaft 14 to form a first left rear blade curved portion 4 and a second right rear blade curved portion 5. Each of the curved rear blade portions, 4 and 5, decrease in width and increase in thickness at the merger of the blade 12 with the shank 14 and provide structural strength where the blade 12 joins the shaft 14. The curved rear blade portions 4 and 5 have rounded edges and are generally smooth. The curved rear blade portions 4 and 5 facilitate removal of the wood bit 10 from the wood substrate without binding of the rear portion of the wood bit 10 against the walls of the bore.

The spade shaped blade 12 is formed using a progressive transfer type of die. The flattened blank 3 is secured during the trimming, forging, punching, and inscription process of the wood bit 10. A stamping operation is used to trim the flattened blank 3 to form the front and side profile of the formed blade 6 to define the cutting spurs, lateral shoulders, central point, and outer side walls of the formed blade 6 as shown in FIG. 4.

At the first station, a first left front quarter panel 7 is trimmed from the left front corner of the flattened blank 3 to form a front leading end portion of the formed blade 6 defining a first left side cutting spur 62, a first left lateral shoulder 40, and a first left central point side 50. As the first left front quarter panel 7 is being trimmed, a second right side quarter panel 8 is trimmed simultaneously from the opposite side of the flattened blank 3, to form the second right outer side 26 of formed blade 6.

The transfer die securing the flattened blank 3 is then moved to a second station to repeat the trimming and forming procedure. A second right front quarter panel 9 is trimmed from the right front corner of the flattened blank 3 to further form the front leading end portion of the formed blade 6 defining a second right side cutting spur 64, a second right lateral shoulder 42, and a second right central point side 52. As the second right front quarter panel 9 is being trimmed, a first left side quarter panel 15 is trimmed simultaneously from the opposite side of the flattened blank 3, to form the first left outer side 24 of formed blade 6.

Figure 4:
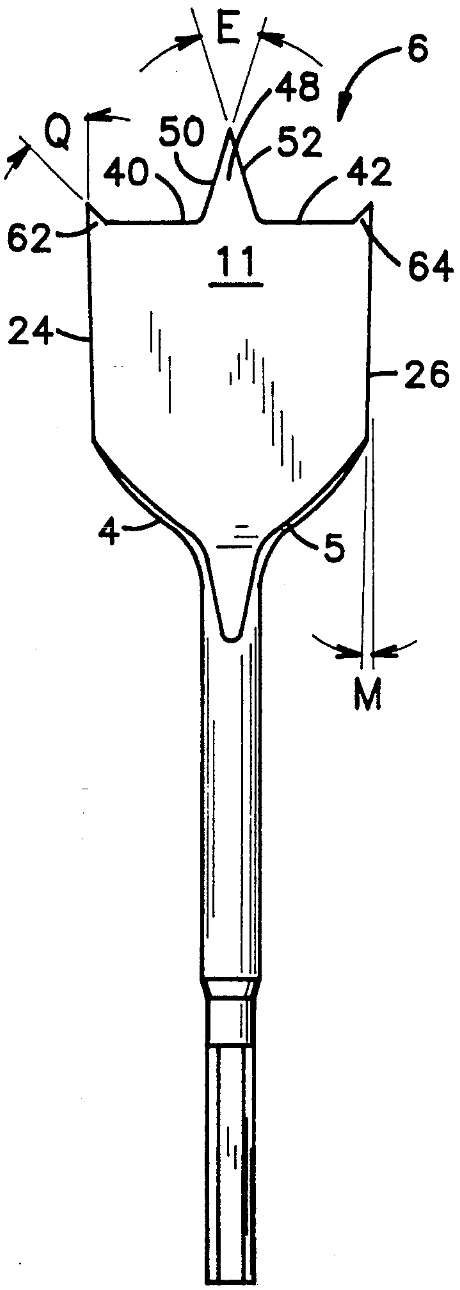
FIG. 4 is a front plane view of the wood bit trimmed from the flattened blank of FIG. 3.
Figure 5:
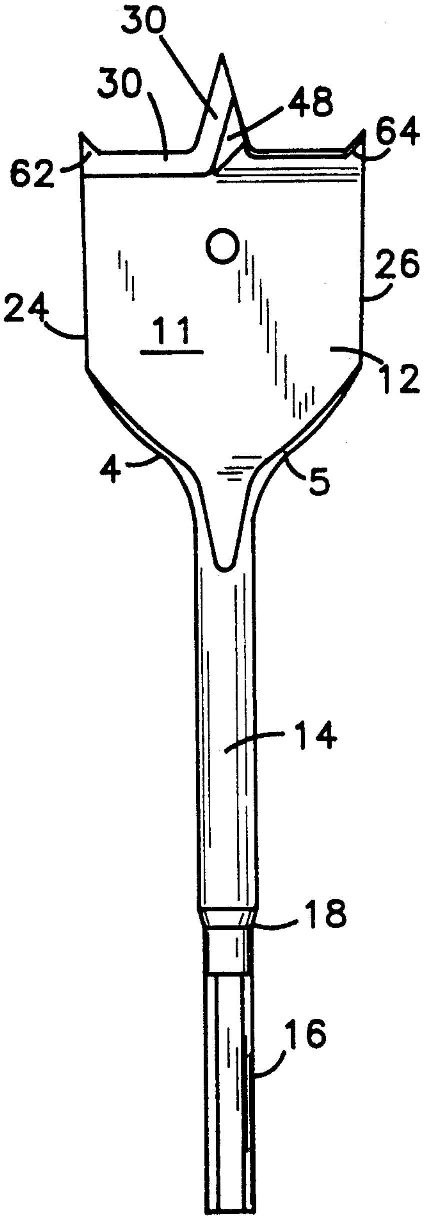
FIG. 5 is a front plane view of the wood bit of the present invention showing the continuous hook forged into the leading end of the blade extending from the side through the spur, lateral shoulder, and the central point after the trimming and forging steps according to the method of manufacture described herein.
Figure 6:
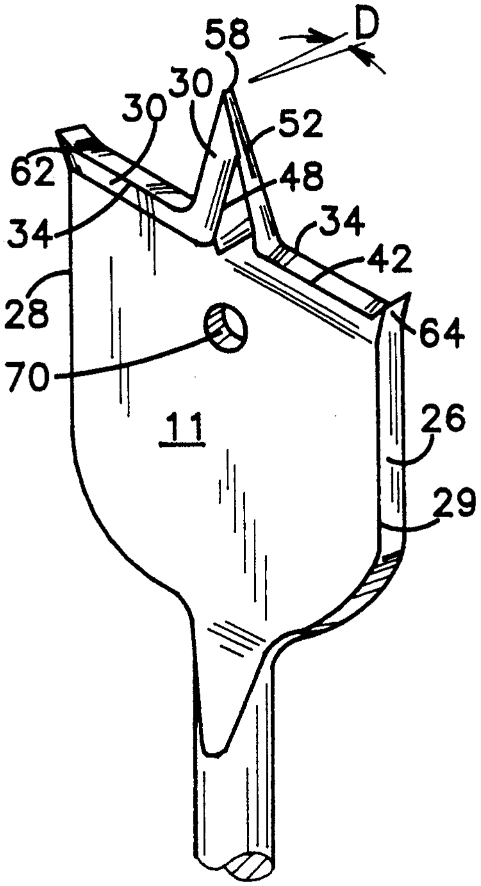
FIG. 6 is an elevated perspective view of the wood bit of FIG. 5 showing the continuous hook forged into the leading end of the blade projecting beyond or outwardly (in the direction of rotation) pass the plane of the blade on each side of the blade extending through the spur and lateral shoulder, twisting and converging at the central point.

As a result of the trimming and forming operation to the flattened blank, the formed blade 6 as shown in FIG. 4, defines a pair of lateral shoulders 40 and 42 extending inwardly from the outer sides 24 and 26, respectively, along the leading end of the formed blade 6 perpendicular to the longitudinal axis of the shaft 14. As best illustrated in FIGS. 1 and 6, the first lateral shoulder 40 is contiguous with the first outer side wall 24 and the second lateral shoulder 42 is contiguous with the second outer side wall 26.

As shown in FIG. 4, the outer sides 24 and 26 are trimmed so that the width of the blade 12 gradually decreases as measured from front to back, defining a side relief of approximately 1 degree as measured from the longitudinal axis to each of the outer sides 24 and 26, respectively of the blade 12, denoted as Angle M.

Figure 7:
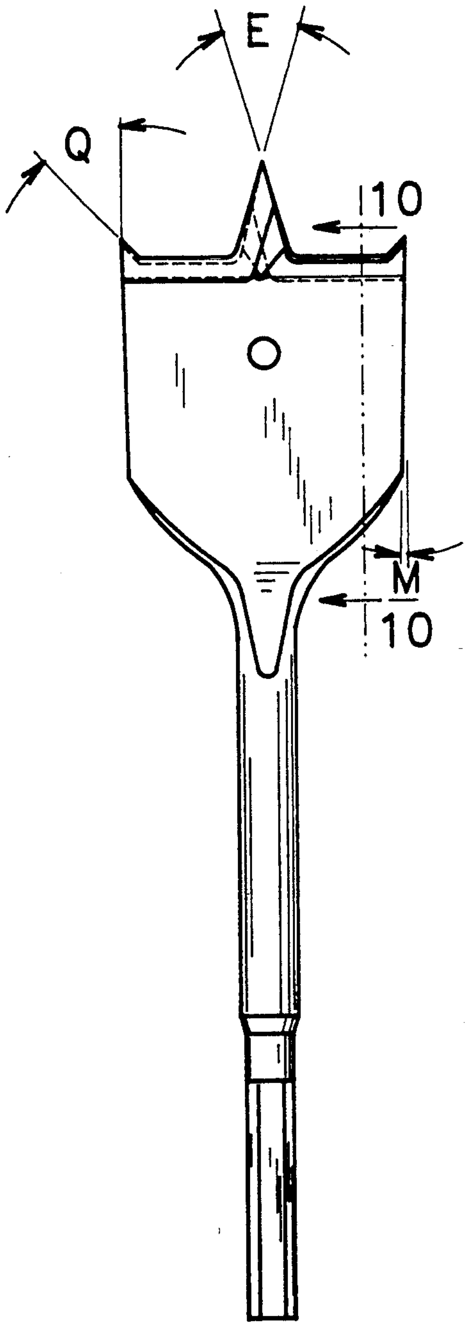
FIG. 7 is a front plane view of a wood bit of FIG. 6, showing the continuous hook forged into the leading end of the blade projecting beyond or outwardly (in the direction of rotation) pass the plane of the blade on each side of the blade and extending through the spur and lateral shoulder, converging at the central point in phantom view; and showing Angle E at the intersection of the hook forming the central point, Angle Q at the intersection of the lateral shoulder and side to form the cutting spurs, and Angle M forming the side relief of the blade body.

FIGS. 4-9 show the first and second side cutting spurs 62 and 64, respectively, wherein the side cutting spurs 62 and 64 are an extension of the outer side walls 24 and 26 of the blade 12. The side cutting spurs 62 and 64 intersect the lateral shoulders 40 and 42, respectively at about a 45 degree angle, Angle "Q" as shown in FIGS. 4 and 7. However, Angle Q may be selected in a range of from an angle of about 35 to 55 degrees depending upon the size of the wood bit 10 and spade shaped blade 12.

As illustrated in FIGS. 4-7, the first left central point side 50 converges with the second central point side 52 at an acute angle ("Angle E"). As shown in FIGS. 4 and 7, Angle E of the preferred embodiment is about 33 degrees for a 1½ inch blade 12; however, Angle E may vary between about 28 and about 45 degrees depending on the size of the wood bit 10.

After trimming both sides of the blank 1, the progressive die and the blank 1 secured therein, are positioned at another station. The orientation and the contours of the blade 12 are achieved in a single step operation prior to the grinding operation that provides the beveled cutting edges.

Figure 9:
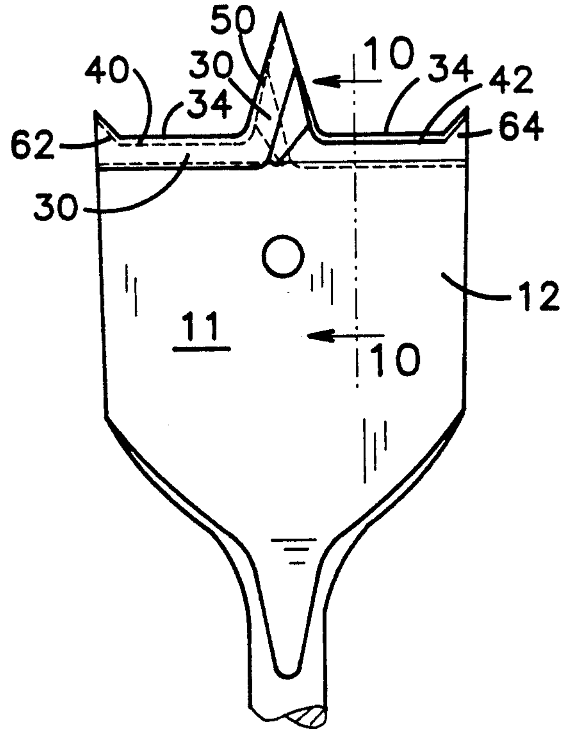
FIG. 9 is an enlarged front plane view of the blade of FIG. 8, showing in phantom view the blending of the continuous hook on each side of the blade at the central point.

A forging process is used to simultaneously bend the leading end of the formed blade 6 on opposite sides of the longitudinal axis at an obtuse angle in equal and opposite directions to form a continuous hook extending from the sides to the central point of the blade. FIGS. 7 and 9 show the continuous hook 30 forged bending the leading end of the blade 12 to project beyond or outwardly (in the direction of rotation) past the plane of the blade 12 on each side of the blade 12 (in phantom view), and extending through the side cutting spurs 62 and 64, and through the lateral shoulders 40 and 42, along the central point sides 50 and 52 respectively, to converge at the central point 48.

Figure 8:
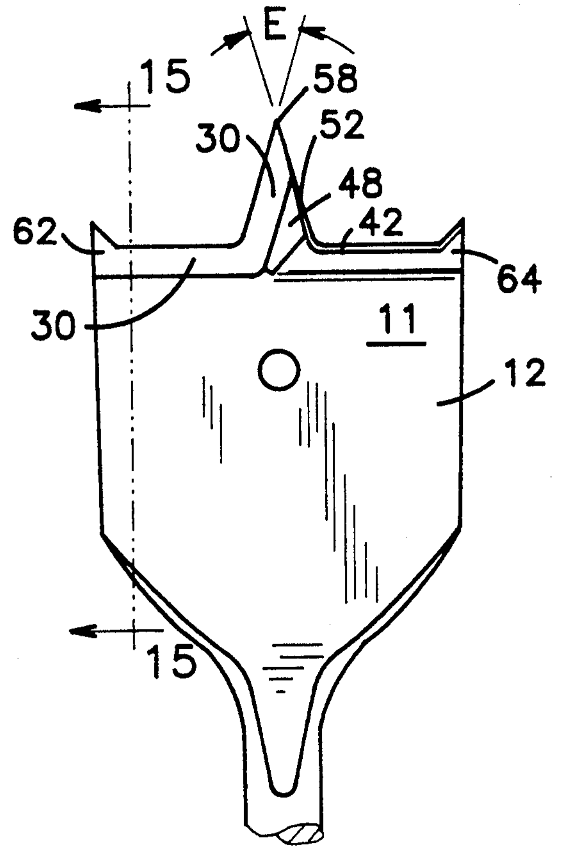
FIG. 8 is an enlarged front plane view of the blade of FIG. 7, showing the continuous hook forged into the leading end of the blade extends from each side through the spurs and the lateral shoulders, to blend into a central point.
Figure 10:
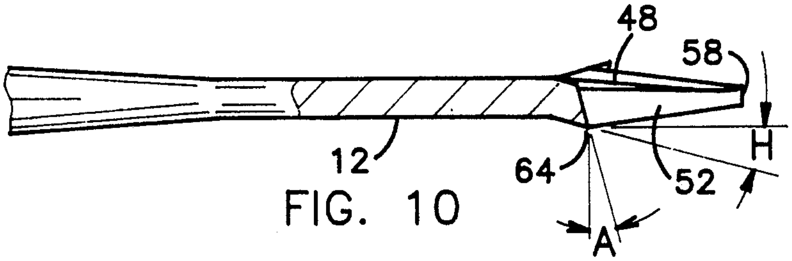
FIG. 10 is an enlarged cutaway side view of Section 10—10 of FIGS. 7 and 9 showing the relief Angle H of the hook forged into the leading end of the blade projecting beyond or outwardly (in the direction of rotation) pass the plane of the blade, extending from the outer sides, along the cutting spurs, and the lateral shoulders; and showing Angle A defining the rake angle of the leading edge, beveled forming a continuous cutting edge extending along the hook from the outer side wall of the blade through the outside cutting spurs, and along the lateral shoulders.

FIG. 8 is an enlarged front plane view of the blade 12 showing the continuous hook 30 forged into the leading end of the blade 12 extending from each side 24 and 26 through the cutting spurs 62 and 64, and the lateral shoulders to blend into a central point. The continuous hook 30 extending along the blade 12, is shown in FIG. 9 in phantom view illustrating the blending of the continuous hook 30 on each side of the blade at the central point. FIG. 10, which is a cut-away view of FIG. 9 along Section 10—10, shows the continuous hook 30 of the blade 12 having a hook Angle H, projecting beyond or outwardly (in the direction of rotation) past the plane of the blade 12.

FIGS. 6, 10, 12, 14, and 15 show the wood bit 10, wherein the continuous hook 30, is offset with respect to the plane of the blade 12 at an angle of from about 5 degrees to about 15 degrees. The relief necessary for a continuous hook for a 1½ inch wood bit of about 0.030" from flat is about 15 degrees for the portion of the continuous hook extending from the outer sides 26 and 28 of the blade 12 along the lateral shoulders 40 and 42 to the intersection with the central point 48, as designated by Angle "H". The length of the continuous hook 30 is approximately ⅛" (measured parallel to the axis of the bit). The continuous hook 30 extending along the lateral shoulders 40 and 42 make a smooth blend with the forged relief of the central point 48.

Figure 15:
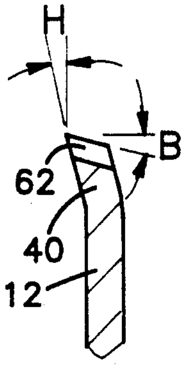
FIG. 15 is a Sectional view along Section 15—15 of FIG. 8, showing the hook angle of FIG. 10, along the side cutting spur extending beyond the leading end of the lateral shoulder, and the beveled cutting edge of the leading end of the side cutting spur.

As illustrated in FIG. 15, which is a cutaway view of FIG. 8 taken along Section 15—15, the angle of the continuous hook 30 is about 15 degrees for the lateral shoulder portion with respect to a plane perpendicular to the plane of the blade 12. Where the profile meets the central point 48, the angle of the continuous hook 30 decreases from about 15 degrees to about 5 degrees along the edge of the central point 58 as you move along the cutting edge.

Figure 11:
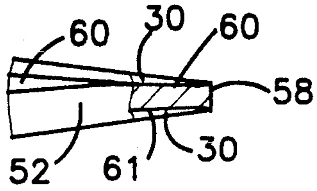
FIG. 11 is an enlarged cutaway side view of the central point of FIG. 10, showing the hook extending above and below the plane of the blade face surface.
Figure 12:
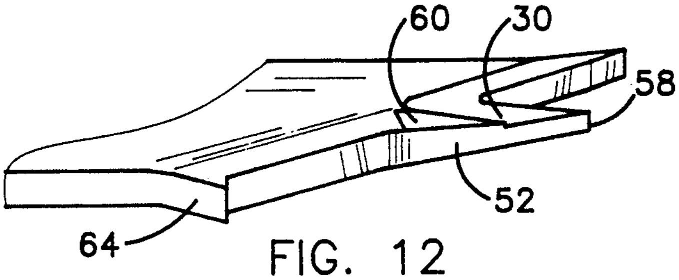
FIG. 12 is an enlarged perspective view of the central point of the wood bit shown in FIG. 10 showing the blending of the hook at the central point and the hook on the spurs projecting pass the plane of the blade surface.
Figure 13:
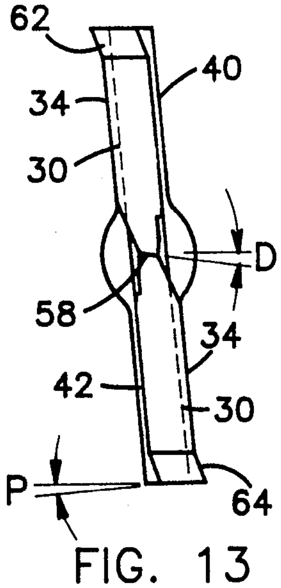
FIG. 13 is a front end view of the wood bit of the present invention showing the forged hook of the central point on each side of the blade projecting outwardly (in the direction of rotation) past the plane of the blade face blending together and twisting at the tip of the central point at an angle, Angle D, with respect to the axis perpendicular to the plane of the blade surface, showing the angle of the axial relief forming the beveled cutting edge of the outer side walls, and showing in phantom lines the extent that the hook projects beyond the plane of the blade surface.
Figure 14:
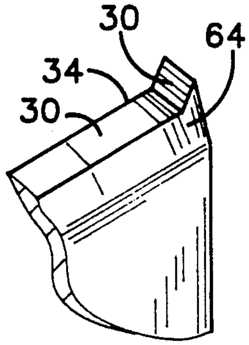
FIG. 14 is a perspective view of the leading end of a corner of the wood blade of the present invention showing the hook extending along the lateral shoulder and through a side cutting spur.

The planar portion of the central point 48 projecting outward from between tip sides 50 and 52 forms a first tip face 60 and a second tip face 61. The tip faces 60 and 61 converge slightly as a result of the forging process, decreasing the thickness or width of the converging central point sides 50 and 52 at the tip 58 of the central point 48. The forged relief of the blade 12 forming the hook 30 extending from the base of point 48 through the central point 48 is defined by a combination of coining and twisting of the central point 48 as shown in FIGS. 11-13. FIG. 11 is an enlarged cutaway side view of the central point 48 shown in FIG. 10, showing the hook 30 projecting above and below the plane of the blade tip surfaces 60 and 61. FIG. 13 illustrates how central point 48 is forged so that it is actually twisted at an angle ("Angle D") at about 5 degrees with respect to the plane of the blade surface. FIG. 13 also shows in phantom view the extent that the hook 30 projects beyond the plane of the blade surface.

The forging of the hook 30 in effect twists the central point 48 and the converging central point sides 50 and 52 providing a smooth continuous hook angle from the first outer side wall 24 extending through the first side cutting spur 62, the first lateral shoulder 40, the central point 48 to the tip 58, wherein the hook angle is twisted to continue on the opposite side of the blade 12 from the tip 58 through the central point 48, the second lateral shoulder 42, the second side cutting spur 64 to the second outer side wall 26.

While immovably retained within the progressive die a hole 70 is punched into the central portion of the blade body 12 for locating the wood bit 10 during the grinding operatioin and for hanging the wood bit during storage. The size or other inscriptions may also be stamped into the metal while the wood bit 10 is still secured in the progressive transfer die.

The wood bit 10 having the desired relief angles is then removed from the progressive transfer die and subjected to a heat treating and at least one annealing process, whereby the wood bit 10 is treated with heat and then cooled to remove internal stresses and to make the material less brittle. The annealing process hardens the steel and produces the desired physical properties in the metal. The wood bit 10 may be subjected to a grit blasting or polishing process to provide the desired external appearance to the blade body 12 and shaft 14 of the wood bit 10. Grit or tumble blasting provides a textured non-glare surface.

After the continuous hook 30 and contours are forged into the blade 12, the leading end of the blade 12 is then ground to form a continuous beveled cutting edge 34 extending along the leading edge of the continuous hook 30 on each side of the blade 12 having a clearance angle, Angle "A", of about 15 degrees with respect to a plane perpendicular to the plane of the blade 12 as shown in FIG. 10. The continuous beveled cutting edge 34 of the continuous hook 30 projects beyond or outwardly (in the direction of rotation) past the plane of the blade 12 extending from the outer sides 24 and 26, along the side cutting spurs 62 and 64, the lateral shoulders 40 and 42, and along the central point sides 50 and 52 to twist and converge at the tip 58. As shown in FIG. 6, the cutting edges 34 on each side of the longitudinal axis are angled complementary to Angle "D" of the hook 30.

Rake angle "A" of FIG. 10, shows the beveled radial cutting edge extending along the leading end of the hook 30 from the sides 24 and 26 through the side cutting spurs 62 and 64, and through the lateral shoulders 40 or 42 is about 15 degrees. Where the profile meets the central point, the angle of the beveled cutting edge extending along the leading edge of the hook 30 decreases gradually from about 15 degrees along the radial/axial edge of the central point 48, as shown in FIG. 10, to about 5 degrees at the tip 58 as you move along the cutting edge with respect to a plane perpendicular to the plane of the blade 12 forming a smooth blended continuous cutting edge 34.

Angle B of FIG. 15, defines a rake angle measured perpendicular to the plane of the blade 12, showing the radial cutting edge extending along the leading end of one of the side cutting spurs 62, 64. As shown in the preferred embodiment, the radial cutting edge of the side cutting spurs 62 and 64 and the radial cutting edges of the lateral shoulders 40 and 42 are both about 15 degrees with respect to a plane vertical to the plane of the blade; however, it is contemplated that Angle "A" and Angle "B" may vary independent of one another.

After the point grinding process is completed, the sides 24 and 26 are honed to provide a beveled, sharpened first left outer side cutting edge 28 and second right outer side cutting edge 29 having an radial relief angle, Angle P, of about 2 degrees on each side of the blade 12 as shown in FIG. 13. The outer side cutting edges 28 and 29, as shown in FIG. 6, form smooth side walls along the bore hole in the wood and facilitate removal of the wood bit 10 from the bore.

The foregoing detailed description is given primarily for clearness of understanding and no unnecessary limitations are to be understood therefrom for modification will become obvious to those skilled in the art upon reading this disclosure and may be made upon departing from the spirit of the invention and scope of the appended claims.

I claim:

1. A wood bit comprising:

a driving end;

a shank connected to said driving end;

a blade attached to said shank, said blade having a pair of parallel opposite faces connected by a pair of outer sides being generally parallel to said shank;

a pair of lateral shoulders extending inwardly from said outer sides, said lateral shoulders converging to form a central point projecting axially from the leading end of said blade;

a pair of cutting spurs projecting forwardly from said shoulders, each spur having an outer edge which is a continuation of said outer side of said blade and which is parallel to said outer side and an inner edge forming a point with said outer edge of said spur; and a continuous hook forged along the leading end of said blade projecting beyond or outwardly in the direction of rotation past the plane of said blade on each side of the axis of said shaft, said continuous hook extending continuously from each one of said sides through each one of said cutting spurs, through each one of said lateral shoulders, and through said central point.

2. The wood bit of claim 1, wherein said shank and blade are of unitary construction.

3. The wood bit of claim 1, wherein said shank comprises a elongated cylindrical shaft having a hexagonal driving end of reduced diameter connected to said cylindrical shaft by a tapered shoulder.

4. The wood bit of claim 1, wherein said blade is formed having a side relief, wherein said blade gradually decreases in width from the front leading end toward the rear of said blade.

5. The wood bit of claim 1, wherein said outer sides are honed providing a pair of outer side cutting edges.

6. The wood bit of claim 1, said blade including a pair of convex shaped rear curved portions having rounded edges disposed at the point of union between said planar large faces and said shank, said rear curved portions decreasing in width and increasing in thickness toward said shank.

7. The wood bit of claim 1, wherein the leading end of said continuous hook is beveled forming a continuous cutting edge along said hook extending from said outer sides, along said lateral shoulders, and along said central point.

8. The wood bit of claim 1, wherein said hook forms an axial rake angle of about 5 to about 15 degrees.

9. The wood bit of claim 1, wherein said cutting spurs intersect said lateral shoulders at about a 45 degree angle.

10. The wood bit of claim 1, wherein said hook extends along said central point, twisting through said central point forming a continuous hook extending from one side of the blade to the opposite side of the blade.

11. The wood bit of claim 1, wherein said hook forms an axial rake angle extending along said lateral shoulder at about 15 degrees with respect to a plane perpendicular to the plane of said blade.

12. A method of forging a wood bit using a progressive transfer die, comprising the steps of:

a) flattening a headed blank of carbon steel;

b) trimming said flattened blank forming a blade having a pair of outer sides generally parallel to the longitudinal axis of said wood bit, and forming a leading end having a pair of cutting spurs connected to said outer sides, a pair of lateral shoulders connected to said cutting spurs, said lateral shoulders converging to form a central point projecting axially from said lateral shoulders;

c) forging a continuous hook along the leading end of said blade by simultaneously bending and twisting said leading end of said blade on opposite sides of the longitudinal axis at an obtuse angle in equal and opposite directions to form a continuous hook extending from the sides to the central point of the blade, whereby said leading end of said blade projects beyond or outwardly in the direction of rotation past the plane of said blade on each side of said blade extending through said side cutting spurs, said lateral shoulders, and along said central point;

d) heat treating said wood bit;

e) annealing said blade having a continuous hook angle;

f) grinding a continuous beveled cutting edge along the leading edge of said hook extending continuously from said outer sides, along said lateral shoulders, and along said central point; and g) honing a beveled cutting edge along the sides of said blade.

13. A wood bit formed in accordance with the process of claim 12.

* * * * *